March 11, 1930.                J. A. STREUN                    1,750,439
                              COTTON PICKER
                           Filed Jan. 8, 1927           3 Sheets-Sheet 1
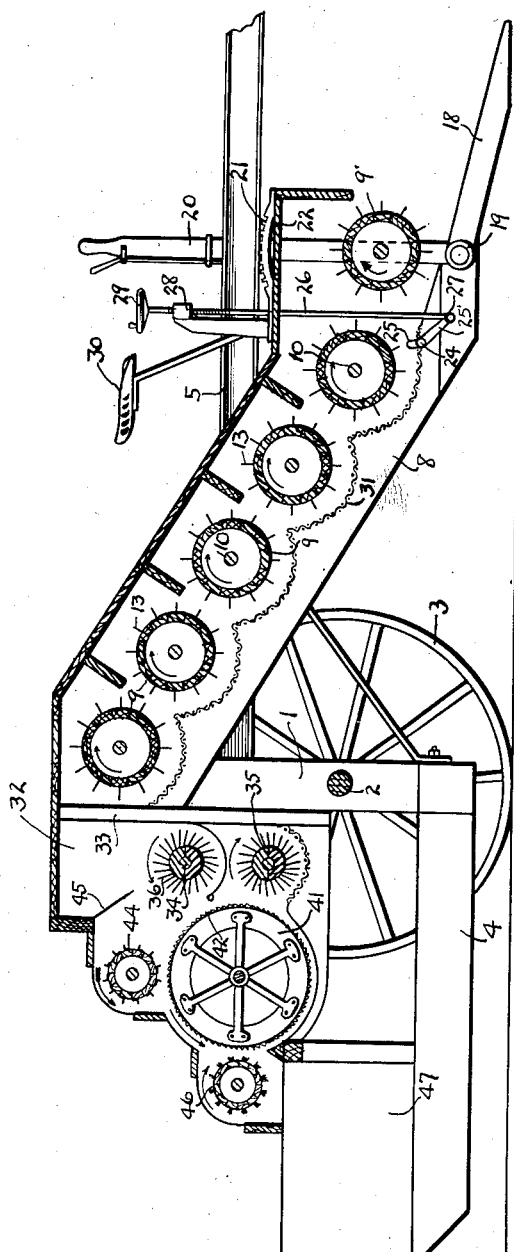
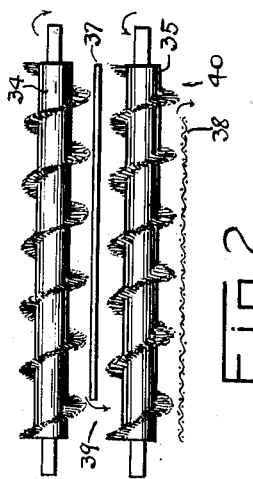
John A. Streun  Inventor
By Jesse R. Stone  Attorney

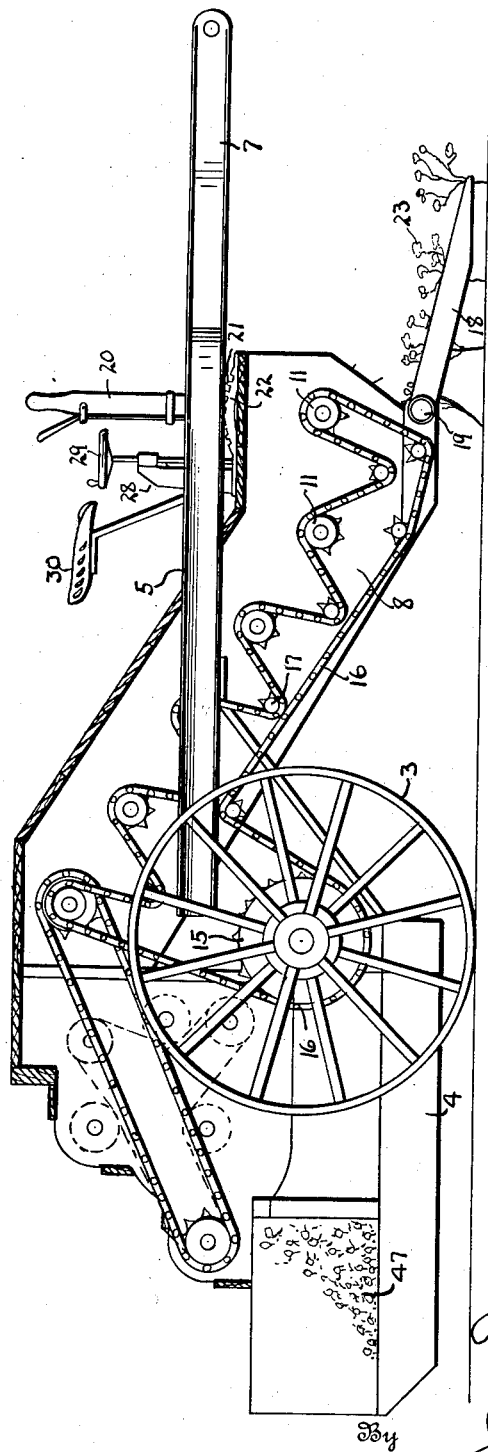

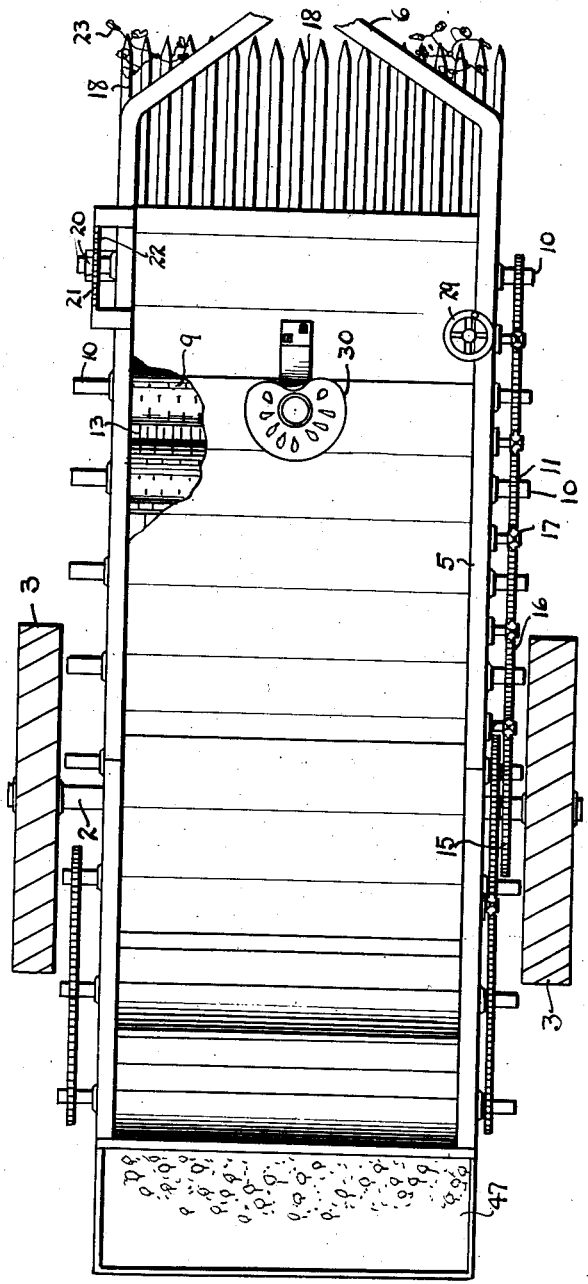

Patented Mar. 11, 1930

1,750,439

UNITED STATES PATENT OFFICE

JOHN ARNOLD STREUN, OF SHERMAN, TEXAS, ASSIGNOR TO HARDWICKE-ETTER COMPANY, OF SHERMAN, TEXAS

COTTON PICKER

Application filed January 8, 1927. Serial No. 159,809.

My invention relates to mechanical devices for picking cotton.

An object of the invention is to provide a machine whereby the cotton may be picked, and then cleaned during its passage through the machine.

It is my aim to construct a machine of few and simple parts which will pick the cotton and eliminate therefrom the leaves, hulls and trash so that the quantity of material hauled to the gin will be materially decreased and the quality of the cotton will be improved by the elimination of dirt and foreign matter.

It is an object to cheapen the cost of harvesting the cotton and to make it possible to pick the cotton quickly, thus avoiding waste and loss from rain, storms, and the like.

My machine is particularly adapted for use in harvesting upland cotton. This type of cotton does not grow rank but is of substantially uniform height and ripens fairly uniformly.

Referring to drawing herewith, Fig. 1 is a side elevation of my improved device, the parts being shown with the side of the machine removed to show the operating parts in end view. Fig. 2 is a front elevation of the conveyor rolls whereby the hulls and trash are eliminated. Fig. 3 is a side elevation of the machine showing the manner in which the parts are operated. Fig. 4 is a top plan view, certain parts being broken away to show the interior. Like numerals of reference are employed to designate like parts in all the views.

In carrying out my invention, I contemplate providing means to remove the bolls of cotton from the cotton plant and to move the bolls together with any leaves and dirt which may be included therewith along a foraminated screen so that the dirt and trash may be sifted through the cotton. I then discharge the cotton, together with the hulls and trash remaining therein, to a trash eliminator which separates the cotton from the hulls and other trash and discharges the clean cotton into a receptacle.

In the drawing, I have shown a vehicle frame made up of two opposite uprights 1, with bearings therein approximately midway of their lengths to receive the axle 2 extending between the two drive wheels 3 at each side of the frame. The lower end of each upright 1 has a rearwardly extending supporting member 4, and the upper end is connected with the longitudinal side supports 5 which may be of structural steel, the forward ends of which are bent inwardly toward each other, as shown at 6, and connected to form a tongue or reach 7, the forward end of which may be connected with a tractor or other means of operation.

Upon the frame thus provided is mounted a housing, the two sides 8 of which are inclined from the upright 1 downwardly below the front ends of the supporting side members 5 and spaced somewhat below the same adjacent the ground. These two supporting members of the housing provide a bearing for a picker roll 9'. This roll is adapted to pick the cotton from the tines or fingers 18 which will be later described. Adjacent the picker roll 9' and arranged in the upwardly inclined housing 8 are a plurality of separator rolls 9. Each of the rolls is mounted upon a shaft 10, journaled in the side walls of the housing, the ends of the shafts extending beyond the sides, and one end of each of the rolls is provided with a sprocket wheel 11, by means of which rotation may be communicated to the roll. Each of the rolls is cylindrical in shape and is provided on its outer face with a series of projecting pins or teeth 13 to engage the cotton and move it within the housing.

The shaft 2 connecting the drive wheels is rotatable with the wheels and has thereon at one side of the frame a sprocket wheel 15, about which a sprocket chain 16 is adapted to run. As shown in Fig. 3, this sprocket chain is engaged about the various sprockets 11 of the separator rolls 9 and the picker roll 9' and over intermediate idle sprockets 17, so as to cause the rotation of the rolls in clockwise direction, as seen in Fig. 1.

At the forward end of the machine are a series of forwardly projecting fingers 18, said fingers being mounted at their inner ends upon a cross bar or shaft 19 journaled in the lower forward end of the housing. Said shaft 19 has on one end thereof an upwardly extending lever 20, by means of which said shaft may be rotated to raise and lower the fingers 18. Said lever has thereon a latch adapted to engage between the teeth 21 of a sector-shaped plate 22, mounted upon the frame. The lever may thus be latched in any adjusted position so as to regulate the height of the fingers 18. Said fingers have their forward ends pointed so as to engage between the stalks of the cotton plants, indicated at 23, and guide the bolls of cotton between said fingers so as to strip the cotton from the stalks and cause it to be moved within the path of the forward rotating picker roll 9'.

Mounted within the frame and between the forward roll 9' and the first separator roll is a breaker shaft 24. Said shaft is rotatable in the side walls of the housing. It has formed on one side thereof a series of teeth 25 against which the bolls of cotton may be forced by the rotating rolls so as to break up the unopened bolls of cotton. The shaft 24 has a downwardly inclined lever 25' thereon and an upwardly extending shaft 26 has a swivel connection therewith at 27. The upper end of the shaft 26 is mounted within a sleeve 28, mounted upon a bracket in the frame, said sleeve being threaded to engage with threads upon the shaft 26 so that the rotation of said shaft will move the lever arm 25 so as to raise or lower the breaker teeth 25. A hand wheel 29 on the shaft 26 enables it to be rotated from the driver's seat 30, placed approximately centrally of the machine.

The cotton entering the forward end of the machine is moved upwardly by the separator rolls 9, over a screen 31. As shown in Fig. 1, this screen is bent to conform with the shape of the adjacent rolls so that the cotton will be carried across the screen and to separate therefrom the dirt and smaller chaff. At the upper end of the screen 31, the cotton is discharged into a rear chamber 32 through an opening indicated at 33. Below this opening are two superposed conveyor rolls 34 and 35. Each roll is mounted upon a shaft rotatable in the sides of the housing and has thereon teeth or pins 36 inclined rearwardly from the direction of rotation. As shown in Fig. 2, the pins or teeth on these rolls are arranged spirally so as to act as conveyors for the cotton and trash delivered thereon and move the same longitudinally within the housing. Each roll has beneath it a trough 37 and 38. The upper trough 37 has an opening, indicated at 39, at one end so that cotton moved longitudinally thereof will be discharged from the trough 37 on to the lower roll through the opening 39. The lower roll will rotate in such manner as to carry the cotton back again longitudinally of the housing over the trough 38, which is made of screen and which will allow dirt and chaff to fall therethrough. An opening 40 at one end of the screen allows the hulls and chaff to drop therefrom to the ground, as will be obvious from Fig. 2.

Adjacent the conveyor rolls is a saw cylinder 41, having teeth 42 thereon inclined forwardly in the direction of rotation and, as will be noted in Fig. 1, said cylinder rotates in a left-hand direction. The teeth 42 thereon are adapted to engage with the lint upon the cotton moved across said cylinder by the conveyor rolls and carry the cotton away from the hulls and chaff upon the said conveyor rolls. Any hulls or unbroken cotton hulls carried along by the cotton lint are adapted to contact with a knocker roll 44, arranged above the saw cylinder and rotatable to throw the hulls backwardly toward the upper conveyor roll 34.

An inclined baffle 45, forwardly of the knocker roll, assists in throwing the hulls and bolls backwardly upon said conveyor roll.

The cotton is removed from the saw cylinder through means of a brush roll 46, placed rearwardly of the saw cylinder and rotating to carry the cotton downwardly into a hopper 47.

In the operation of this device, the machine will be drawn along the cotton rows, and the forward fingers 18 will be lowered so as to engage beneath the branches of the cotton plant and draw the cotton upwardly between the fingers and strip the cotton from the plant. The cotton will then be engaged by the picker roll 9' and then the separator rolls 9, being carried upwardly over the screen 31, thereby separating from the cotton a material amount of foreign matter. The cotton thus cleaned will be discharged through the opening 33 upon the upper conveyor roll 34 and carried longitudinally of the saw cylinder. Most of the cotton will be removed from the hulls and trash during the passage of the same along the cylinder. The hulls and trash will be delivered from the upper trough on to the lower conveyor roll and carried in across the forward face of the saw cylinder, so that all of the lint will be gradually removed from the trash which will be discharged at the end of the trough 38 through the opening 40 upon the ground. The cotton carried by the saw cylinder will be removed by the brush roll and discharged into the hopper 47 or removed from the machine in any desired manner. It is understood that the usual vacuum system whereby a suction fan is employed to direct the cotton upwardly through a chute to discharge out into any desired receptacle may be employed, if desired, these devices being old and not a part of my invention.

The advantages of this type of machine lie in the simple and strong construction of the device and in the means provided by the machine for cleaning and improving the grade of the cotton. Hand-picked cotton always contains with it a material amount of dirt and trash which must be carried to the gin and expense must be undergone to remove the same from the cotton after it has been transported to the gin. With my improvement, the dirt and trash will be removed from the cotton, together with the hulls, before it is carried to the gin and said hulls and trash will be left in the field where it can be ploughed under without necessitating any expense or trouble in removing it from the gin, as is now necessary. The grade of cotton will be raised and the price obtained for the cotton will be improved and the cost of gathering the cotton will be materially decreased.

Having thus described my invention, what I claim as new and desire to protect by Letters Patent is:

1. A cotton picker and separator vehicle having a forward cotton-receiving opening adjacent the ground, means to pass the cotton rearwardly, an upwardly inclined chute having a perforated wall below the same, separator rolls adapted to pass the cotton upwardly along said wall, and means to eliminate the hulls and dirt thereafter and move the cotton to a receptacle.

2. A cotton picker including a frame, a housing thereon, means to engage cotton and move it rearwardly, breaker means co-operating with said cotton moving means to break up the cotton including a rotatable shaft, a set of inwardly extending teeth thereon and means to rotate said shaft from above said housing to present a portion of said teeth below said cotton engaging means.

In testimony whereof I hereunto affix my signature this 1st day of January, A. D. 1927.

JOHN ARNOLD STREUN.